United States Patent [19]
ten Brink

[11] Patent Number: 5,910,950
[45] Date of Patent: Jun. 8, 1999

[54] DEMODULATOR PHASE CORRECTION FOR CODE DIVISION MULTIPLE ACCESS RECEIVER

[75] Inventor: Stephan ten Brink, Holmdel Township, N.J.

[73] Assignee: Lucent Technologies Inc., Murray Hill, N.J.

[21] Appl. No.: 08/699,008

[22] Filed: Aug. 16, 1996

[51] Int. Cl.[6] .................................................. H04J 13/00
[52] U.S. Cl. ........................ 370/342; 370/209; 370/320; 375/205
[58] Field of Search .................................. 370/203, 206, 370/209, 320, 335, 342, 441, 479; 375/200, 205, 206, 321

[56] References Cited

U.S. PATENT DOCUMENTS

| | | | |
|---|---|---|---|
| 4,397,039 | 8/1983 | McAuliffe | 375/321 |
| 5,325,394 | 6/1994 | Bruckert | 375/200 |
| 5,442,625 | 8/1995 | Gitlin et al. | 370/342 |
| 5,506,865 | 4/1996 | Weaver, Jr. | 370/206 |
| 5,577,025 | 11/1996 | Skinner et al. | 370/209 |

*Primary Examiner*—Douglas W. Olms
*Assistant Examiner*—Shick Hom

[57] ABSTRACT

A demodulator of a Code Division Multiple Access Receiver (CDMA) provides single user pilot code aided coherent demodulation of QPSK/CDMA signals using a switch and squarers instead of multipliers. Additionally, a coherent Multicode (MC) CDMA demodulator with a switch for sharing pilot and data correlator results is presented. This change in the demodulators reduces by one-half the number of additions required in the accumulator part for both, the CDMA and the MC-CDMA receiver.

10 Claims, 6 Drawing Sheets

DEMODULATOR PHASE CORRECTION FOR CODE DIVISION MULTIPLE ACCESS RECEIVER

CROSS-REFERENCE TO RELATED APPLICATIONS

Related subject matter is disclosed in the previously filed applications entitled "METHOD AND APPARATUS OF A MULTI-CODE CODE DIVISION MULTIPLE ACCESS RECEIVER HAVING SHARED ACCUMULATOR CIRCUITS", Ser. No. 08/700,257, filed on Aug. 20, 1996, H. C. Huang, C.-L. I., A. Partyka, S. ten Brink and C. A. Webb III; "METHOD AND APPARATUS OF A MULTI-CODE CODE DIVISION MULTIPLE ACCESS RECEIVER USING A SINGLE DATA CORRELATOR" Ser. No. 08/700,257, filed on Aug. 20, 1996, by H. C. Huang, C.-L. I, and C. A. Webb III; and "AN IMPROVED MULTI-CODE CODE DIVISION MULTIPLE ACCESS RECEIVER," by C.-L. I., S. ten Brink, A. Partyka, and C. A. Webb III, now U.S. Pat. No. 5,737,326 issued on Apr. 7, 1998, all of which are assigned to the same Assignee.

FIELD OF THE INVENTION

This invention relates to improvements in coherent Code Division Multiple Access (CDMA) receivers and coherent Multi-Code (MC) CDMA receivers.

BACKGROUND OF THE INVENTION

Code Division Multiple Access (CDMA) Direct Sequence Spread Spectrum Signaling is one of the most promising multiplexing technologies for cellular telecommunications services. The advantages include superior performance in multipath environments and improved cellular capacity. In spite of a multitude of advantages this technology offers, conventional CDMA systems have very limited user throughput and are not well suited to. "bandwidth on demand" multimedia applications. To accommodate such greater bandwidth applications, a Multi-Code CDMA (MC-CDMA) system was proposed and is the subject of U.S. Pat. No. 5,442,625, entitled "Code Division Multiple Access System Providing Variable Data Rate Access To A User," issued on Aug. 15, 1995. A straightforward implementation of a receiver for the MC-CDMA system may be significantly more complex than a receiver for a conventional CDMA system. Care must be taken to avoid increasing the complexity of the receiver by a factor of N in order to support N channels.

The patent applications "METHOD AND APPARATUS OF A MULTI-CODE CODE DIVISION MULTIPLE ACCESS RECEIVER HAVING SHARED ACCUMULATOR CIRCUITS" by H. C. Huang, C.-L. I, A. Partyka, S. ten Brink and C. A. Webb III, Ser. No. 08/700,257, filed on Aug. 20, 1996; "METHOD AND APPARATUS OF A MULTI-CODE CODE DIVISION MULTIPLE ACCESS RECEIVER USING A SINGLE DATA CORRELATOR" by H. C. Huang, C.-L. I., S. ten Brink and C. A. Webb III, Serial No. 08/700,262 filed on Aug. 20, 1996, and "AN IMPROVED MULTI-CODE CODE DIVISION MULTIPLE ACCESS RECEIVER," by C.-L. I., A. Partyka, and C. A. Webb III, now U.S. Pat. No. 5,737,326 issued on Apr. 7, 1998, describe various techniques for reducing the circuitry and the resulting associated cost and power consumption of MC-CDMA receivers.

Notwithstanding the improvements provided in those applications, there is a continuing need to further reduce the cost and power consumption at both the transmitter and receiver locations. Increases in cost and power consumption are of particular concern for mobile terminals.

SUMMARY OF THE INVENTION

In accordance with the present invention, cost and power consumption is further reduced for a Code Division Multiple Access (CDMA) receiver. The receiver receives a coherent CDMA signal including k (where k>or=to 1) encoded data channels and at least one pilot channel.

In a first embodiment, the k data channels are QPSK/CDMA signals encoded using mutually orthogonal codes ( e.g., Walsh codes ). A demodulator which decodes one of the k data channels and a pilot channel includes a "Walsh switch" for switching the desired data channel and the pilot channel to an accumulator circuits for further processing (e.g., demodulation of the desired data channel). A "Walsh switch" is a binary switch which is switching between its two states according to a Walsh code. Another feature of the invention enables squarers to be substituted for multipliers in the demodulator.

A second embodiment enables a Multi-Code (MC) Code Division Multiple Access (CDMA) receiver to receive a coherent CDMA signal including k (where k>or=to 1) encoded data channels and at least one pilot channel. A demodulator which decodes the k data channels and the at least one pilot channel includes a Walsh switch for switching both the at least one pilot channel and the encoded k data channels to groups of processing circuits for demodulating the k data channels.

The two embodiments are based on two ideas: The "Walsh switch" idea and the "squarer" idea. The Walsh switch idea allows to share the results of the pilot and data accumulator and applies to both, the first and the second embodiments, whereas the squarer-idea only applies to the first embodiment.

GENERAL DESCRIPTION

The present invention describes a novel single user demodulator structure for coherent pilot code aided synchronous QPSK/CDMA communication links (Quadrature Phase Shift Keying/Code Division Multiple Access). An important example of a system using pilot aided QPSK/CDMA in the forward link (base-station to mobile) is described in TIA/EIA/IS-95 (TIA: Telecommunications Industry Associations; EIA: Electronic Industries Association; IS: Interim Standard) which is accepted as a digital cellular phone standard for North America. The start of a widespread commercial application of CDMA digital cellular is predicted for the end of 1997.

Figure 10:
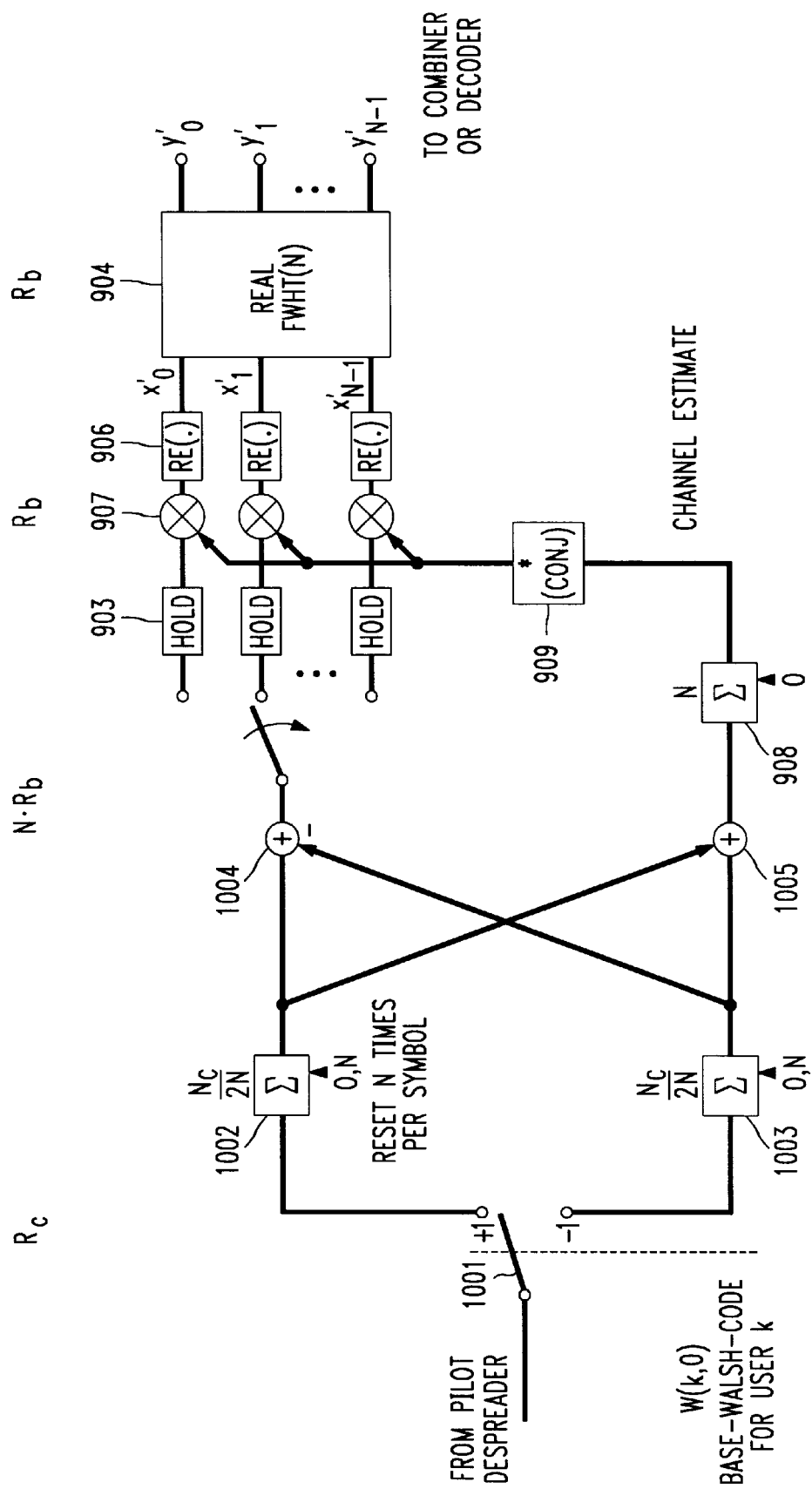
FIG. 10 shows a block diagram of a second embodiment: an improved multiple data correlator arrangement in accordance with the present invention, namely applying the Walsh switch idea to a MC-CDMA receiver

The present invention eliminates the use of phase correction multipliers used for coherent demodulation. The multipliers are substituted by "squarers" which allow for a novel implementation. This turns two-operand operations (multiplications) into one-operand operations (squarings). This is advantageous for implementing the "squarer" as a lookup-table rather and eliminates the multiplications that are performed, e.g., by a Digital Signal Processor (DSP) used for doing the phase correction. Furthermore the number of additions performed in the accumulator part is halved with a corresponding decrease in power dissipation. The present invention can also be adapted to a Multi-Code CDMA receiver as shown in FIG. 10. In view of increasing importance of wireless services, the present invention is of particular interest for improving implementation-efficiency in handset-designs.

DETAILED DESCRIPTION

Figure 1:
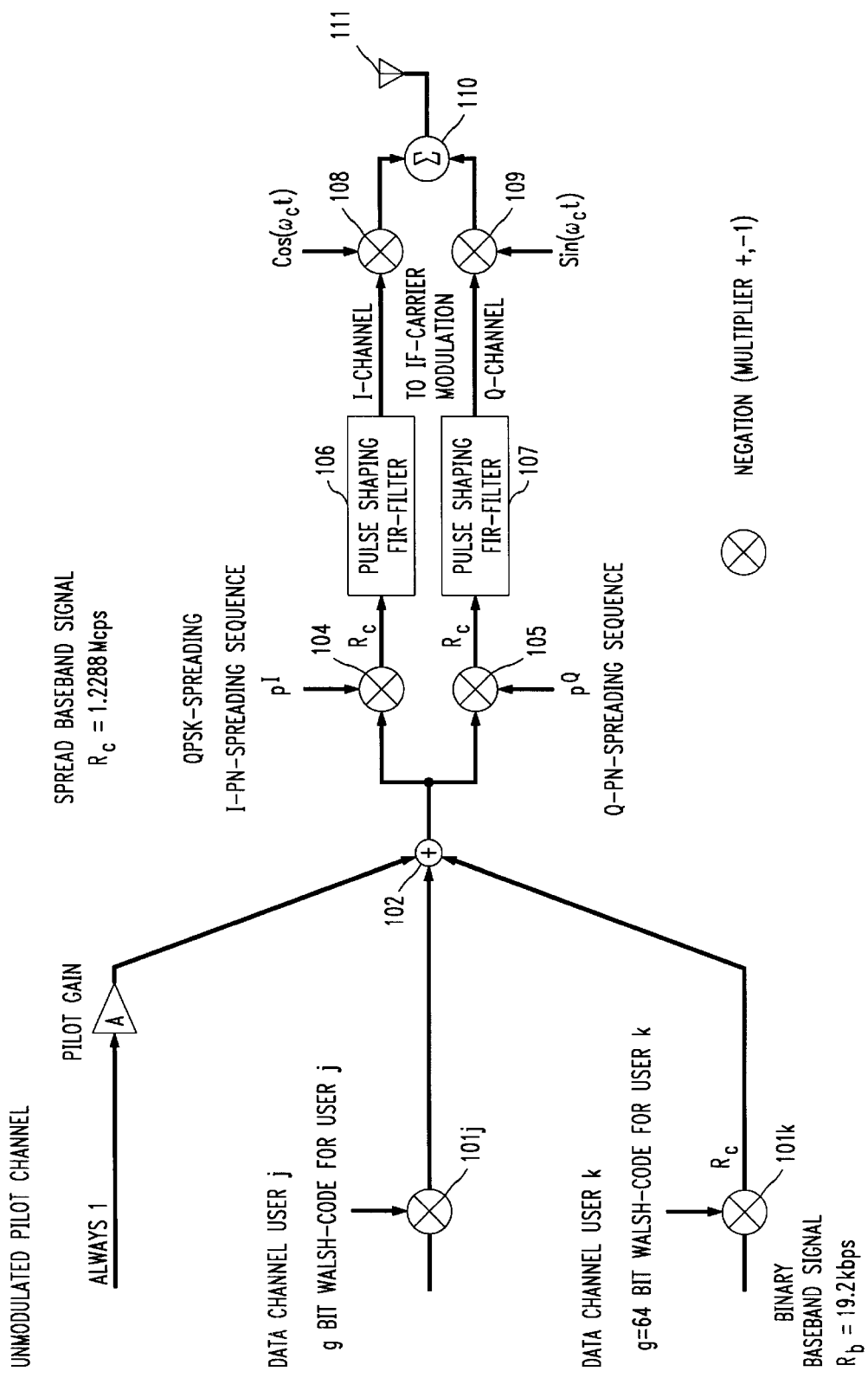
FIG. 1 shows a typical transmitter of a CDMA communication link useful in explaining the operations of the present invention.

Shown in FIG. 1 is a transmitter for a synchronous pilot code aided CDMA communication link, including the values given for IS-95. As shown, data signals from, e.g., Users j and k at rate $R_b$ (bit-rate, symbol-rate) are coupled to code spreaders, 101j and 101k, where different orthogonal Walsh codes of length g (g=64) are used as user-individual spreading sequences. The outputs of code spreaders 101j and 101k are combined together with a pilot signal in adder 102 to form a Walsh-spread baseband signal. There are at most g-1 data channels (including control channels) which can be utilized at once (one channel is occupied by the pilot signal).

The Walsh-spread baseband signal, illustratively, at rate $R_c$ is multiplied in coders 104–105 by another PN-code spreading sequence, also called short code or pilot code sequence.

This spreading (Walsh- and short-code spreading) widens the bandwidth of the data signal over a broad frequency spectrum. The resulting signal at the chip-rate occupies a $$g = \frac{R_c}{R_b}$$

times larger bandwidth than the unspread signal at the symbol-rate. The spreading sequence, illustratively, may be a periodic binary PN-sequence (PN: Pseudo Noise), different for the I- and Q-channel (QPSK-spreading). The spreading sequence is also called "chip-sequence" and thus the processing rate after the spreading is called "chip-rate" $R_c$.

Note an unmodulated pilot code (Walsh-code 0, always +1, and its data always +1) is embedded in the composite signal as a phase reference for coherent demodulation of the data channels at the receiver. One pilot channel for all users is sufficient since it is a synchronous CDMA link.

The outputs from coders 104–105 are each filtered by FIR filters, 106 and 107, respectively. The outputs of the FIR filters 106 and 107 are then up-converted by modulators 108 and 109 using radio carrier frequency signals $\cos(\omega_c t)$ and $\sin(\omega_c t)$, respectively. The output of modulators 108 and 109 are radio frequency signals which are combined in combiner 110 and transmitted via antenna 111 over the air to the mobile user stations.

This radio frequency QPSK/CDMA signal includes all channels summed together (data-channels, pilot channel). One bit in the baseband (also referred to as symbol) at rate $R_b$ consists of g 'chips' at rate $R_c$ on the channel.

Illustratively, for an IS-95 type transmitter the parameters are: $R_b$=19.2 kbps (kilobit per second), $R_c$=1.2288 Mcps (megachip per second), thus g=64

Figure 2:
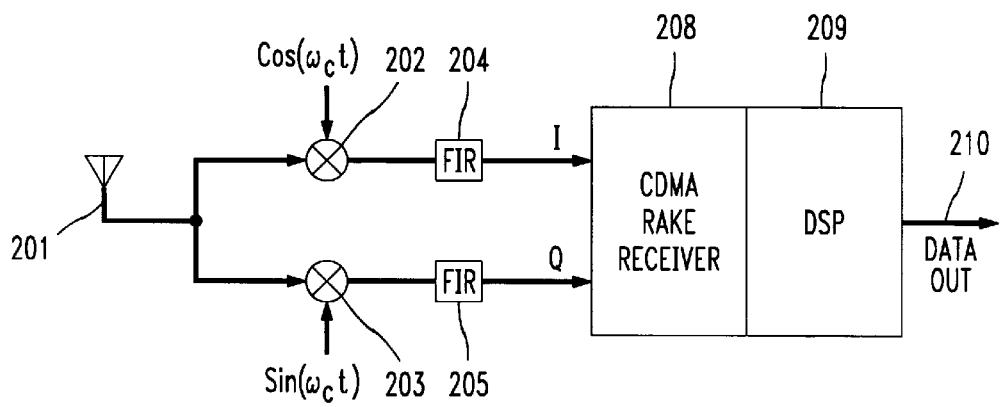
FIG. 2 shows a simplified block diagram of an illustrative CDMA receiver

FIG. 2 shows a simplified block diagram of an illustrative CDMA receiver that can be used at a mobile station. The radio frequency signals received via antenna 201 are down-converted by modulators 202 and 203, using radio frequency signals $\cos(\omega_c t)$ and $\sin(\omega_c t)$, respectively. The output of demodulators 202 and 203 are each filtered by an anti-aliasing LPF (Low Pass Filter) 204 and 205, respectively to produce a resulting baseband I and Q signals. The I and Q signals are then further decoded and despread by a CDMA RAKE receiver 208 operating under control of Digital Signal Processor (DSP) 209 to produce the output data signal 210. The DSP forms a weighted average of each of the data signals received by a different finger, where each finger tracks a different multipath component. A RAKE receiver is an (almost) optimum mechanism for receiving signals in a multipath environment.

Before we discuss the embodiment of our CDMA demodulator finger, we first review the operations of a prior art CDMA RAKE receiver.

An illustrative example of a RAKE receiver is described in the following references 1) "A Communication Technique for Multipath Channels" by R. Price and P. E. Green Jr.; Proceedings IRE, Vol. 46, Pages 555–570, March, 1958

2) "Introduction to Spread Spectrum Anti-multipath Technique and Their Applications to Urban Digital Radio" by G. L. Turin; Proceedings IEEE, Vol. 68, No. 3, Pages 328–353, March, 1980

3) "Digital Communications" by J. G. Proakis; McGraw-Hill, 1989

Figure 3:
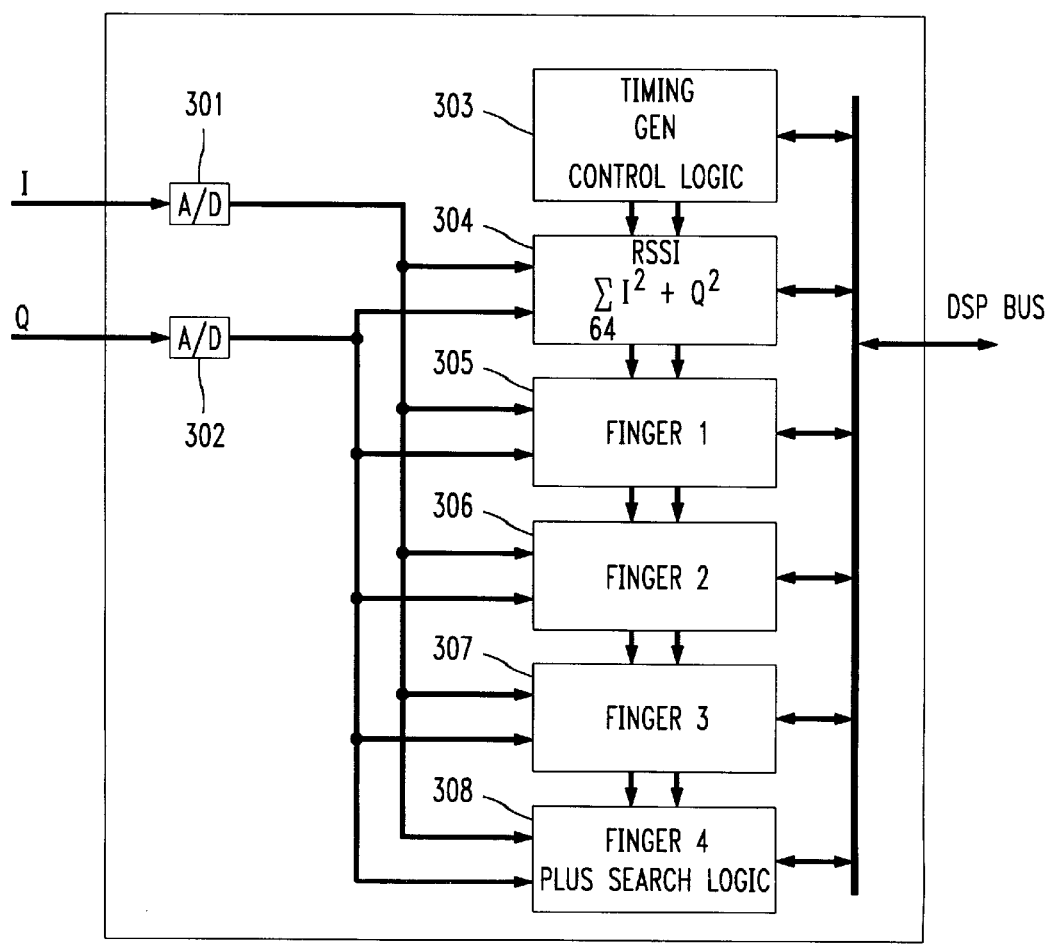
FIG. 3 shows a simplified block diagram detail of an illustrative multipath combining CDMA rake receiver.

FIG. 3 shows an illustrative block diagram of a prior art RAKE receiver typically used in a CDMA system. A RAKE. receiver is used in both the forward and reverse links of a CDMA system to take advantage of the inherent time diversity in the received signals arriving via different paths of a multipath environment.

Analog I signals (I) and Q signals (Q) are converted to digital signals by the A/D circuits 301 and 302, respectively. Control logic circuit 303, provides Digital Signal Processor (DSP) interfacing and control, as well as common timing and control functions for the CDMA receiver. Control logic circuit 303 operates under control of signals received over DSP bus from a DSP, not shown. An RSSI (Received Signal Strength Indicator) block 304 calculates the total received signal power of the I and Q signals received over the various signal paths.

In a path-diversity RAKE receiver, there are several (typically 4) mostly identical "finger" units 305–308. Each of the finger units 305–308 is used to despread/demodulate a received signal arriving over a different air path of the multipath environment. These finger units 305–308 are essentially the same except they have a different time delay, attenuation and phase characteristics. The finger unit 308 additionally includes a small amount of additional logic to allow its use as a high-speed pilot searcher (for use in coherent receivers to detect the Walsh signal pilot shown in FIG. 1).

The pilot searcher finger 308 examines the incoming signal by continuously correlating it with the pilot PN-sequence. It detects different base-stations and multipath-components and delivers the respective PN-offsets to the demodulator fingers 305–307.

Each demodulator finger performs a coherent demodulation of a certain path of the incoming multipath-distorted signal. In the following we present different finger-designs and point out the differences between the structures of the prior art and the present invention.

In the following description, conventional variable names are used and are defined below:

$$R_c = \frac{1}{T_c}$$

Chip-rate, IS-95: 1.2288 Mcps $$R_b = \frac{R_c}{N_c}$$

Bit-rate (=symbol-rate), IS-95: 19.2 kbps
$P_k^{I,Q}$ PN-sequence for the I- and Q-channel (+1, −1, . . . )
$W_k$ Walsh-code (the same for I and Q) for a certain user
$x_l$ User-data at bit-rate $R_b$ (for certain user according to Walsh-code)
$\phi$ Phase shift $e^{j\phi}$ of incoming signal (I-, Q-channel)
$N_c$ Number of chips per symbol (bit), IS-95: 64
$N_p$ Number of chips for phase recovery (usually a multiple of $N_c$)
A Pilot gain (in comparison to single user)

The following description does not use complex notation to be closer to the hardware implementation. The incoming signal $u_1 = u_1^I + j u_1^Q$ is received, from the A/D converters 301 and 302 of FIG. 3, as a sampled complex baseband signal at the chip-rate $R_c$ (the real component is the in-phase component $u_1^I$, also referred to as I-channel; the imaginary component is the quadrature-component $u_1^Q$, also referred to as Q-channel). For simplicity, optimally chosen sampling times are assumed so one has not to consider pulse shaping or tracking.

Figure 4:
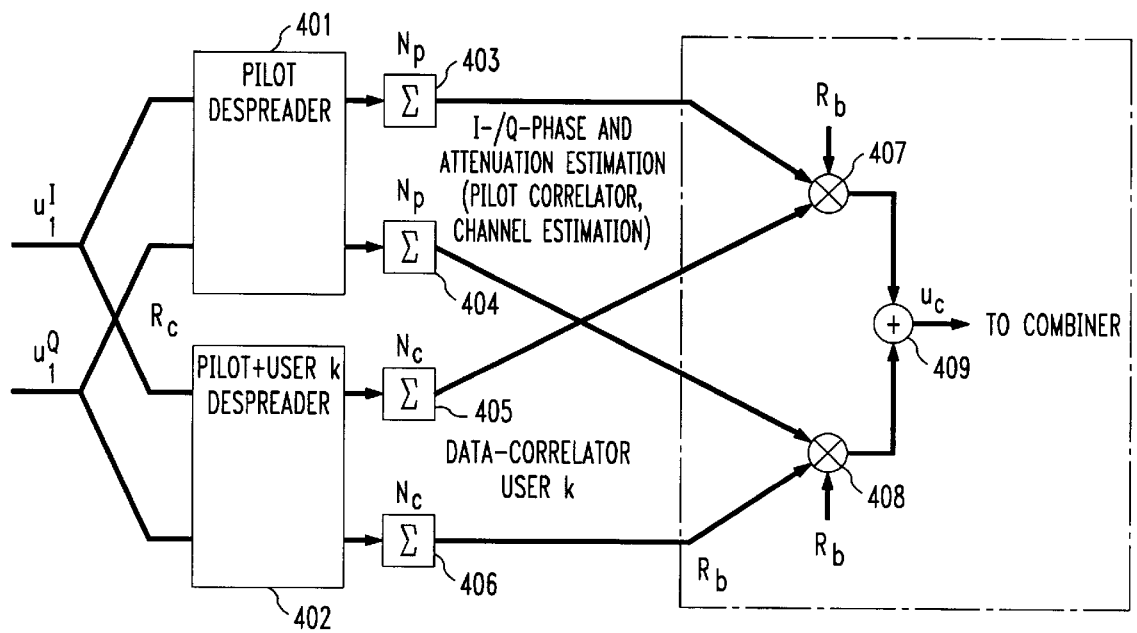
FIG. 4 shows a simplified block diagram of a prior art demodulator "finger" of a rake receiver.
Figure 5:
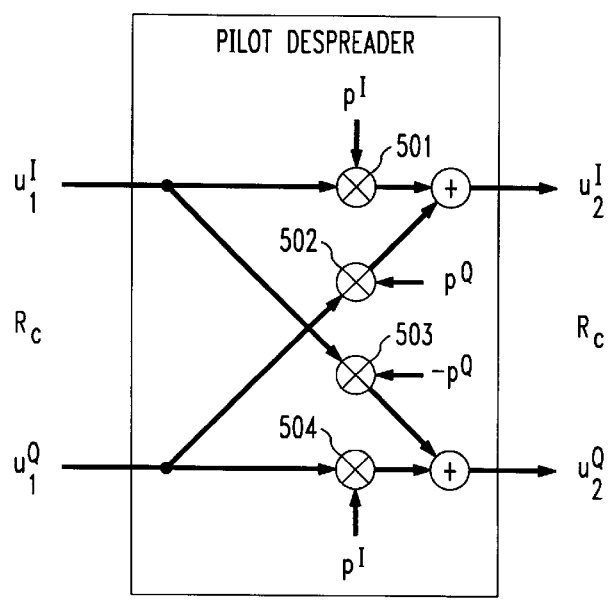
FIG. 5 shows a simplified block diagram of an illustrative I-/Q-pilot despreader.

With joint reference to FIGS. 3, 4 and 5, we describe the prior art use of separate correlators for phase estimation and data demodulation. The straightforward solution to the coherent demodulation problem of CDMA-signals is the widely used 'separate correlators structure'. First let us assume $N_p = N_c$ (id est: phase estimation accumulation over one symbol).

Each finger ( 305–308 of FIG. 3 ) contains a pilot on-time correlator for channel estimation and a data on-time correlator for recovering the binary data signal. The pilot correlator consists of a despreading part 401 and an accumulation part 403, 404. The data correlator consists of a despreading part 402 and an accumulation part 405, 406. The pilot despreader 401 is shown in FIG. 5 to function as a I-/Q-pilot despreader: providing complex multiplication, using multipliers 501–504, of the incoming signals $u_1^I$ and $u_1^Q$ with the pilot-PN-spreading sequences $p^I$ and $p^Q$. Actually, the multipliers 501–504 are simple negations since the PN-sequence is a random sequence of +1, −1.

Similarly, the pilot and Walsh despreader 402 of FIG. 4, using multipliers (not shown), despreads the incoming signals $u_1^I$ and $u_1^Q$ using a pilot signal multiplied by a Walsh code sequence.

In the accumulators 403–404 of FIG. 4, the output of the pilot despreader 401 gets accumulated over one symbol period ($N_p = N_c$ chips) to recover the I-/Q- phase and attenuation estimation (also referred to as a channel estimate).

In the accumulators 405–406 of FIG. 4, the output of the pilot and User k despreader 402 gets accumulated over one symbol period ($N_c$ chips) to recover the baseband bit data for User k. Thus, for each symbol, there is one output of the pilot correlator and one of the data correlator. The phase correction multiplication, in multipliers 407 and 408 at the symbol rate $R_b$, provides a phase corrected signal which can be used —after addition 409—for the binary decision to determine whether a 0 or a 1 was sent (as shown, however, it is outputted to the combiner which coherently combines several concurrently demodulated paths).

It should be noted that the phase estimation (or channel estimate) could be performed over more than one symbol, e.g. over 4 symbols ($N_p = 4N_c$).

Figure 6:
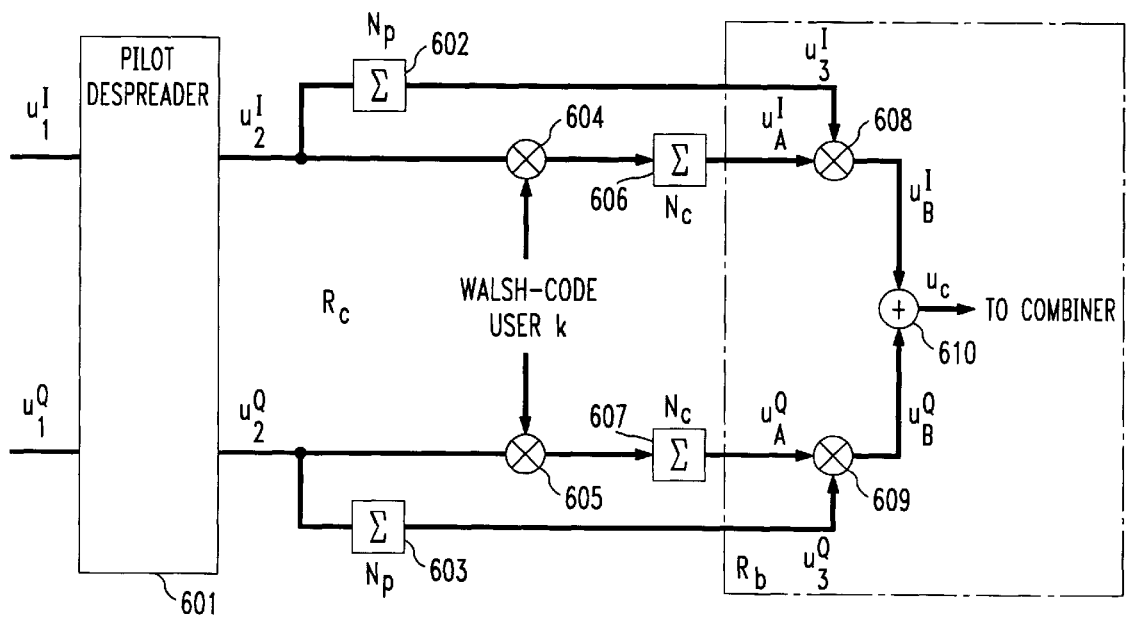
FIG. 6 shows a simplified block diagram of a combined demodulator finger where one pilot despreader is shared by the pilot correlator branches and the data correlator branches.

With reference to FIG. 6, the well known combined design is described. In the combined design only one pilot despreader 601 is necessary, but the accumulation part remains almost the same as that shown in FIG. 4. Since there is no separate Pilot and Walsh-Despreader 402 anymore, the Walsh-negations have to be performed explicitly. A similar structure can be found in the book by Andrew J. Viterbi, "CDMA—Principles of Spread Spectrum Communication", Addison-Wesley 1995, which uses a phase correction multiplication at the chip-rate.

The analysis for the combined design is as follows. The I-, Q-channel after IF-sampling (without index k) only for one user is (for simplicity the signals are normalized to a user's channel amplitude 1):

$$u_1^I = p_k^I(W_k x_l + A) \cos \phi - p_k^Q(W_k x_l + A) \sin \phi$$

$$u_1^Q = p_k^I(W_k x_l + A) \sin \phi + p_k^Q(W_k x_l + A) \cos \phi$$

After pilot despreading, 601, the signals are ($\delta_k^{I,Q}$ is some additional noise which will vanish after the accumulation):

$$u_{2_k}^I = 2(x_l W_k + A) \cos \phi + \delta_k^I$$

$$u_{2_k}^Q = 2(x_l W_k + A) \sin \phi + \delta_k^Q$$

Accumulation, using accumulators 602 and 603, over a certain number of chips gives rise to the recovered pilot phase signals (averaging out of $\delta_k^{I,Q}$ and $x_l W_k$):

$$u_3^I = \sum_{k=0}^{N_p-1} (2(x_l W_k + A)\cos\phi + \delta_k^I) \approx 2 N_p A \cos\phi$$

$$u_3^Q = \sum_{k=0}^{N_p-1} (2(x_l W_k + A)\sin\phi + \delta_k^Q) \approx 2 N_p A \sin\phi$$

Walsh-despreading, using multipliers 604, 605 and accumulators 606, 607, produces the data signals (averaging out of $AW_k$ and $W_k \delta_k^{I,Q}$):

$$u_A^I = \sum_{k=0}^{N_C-1} W_k u_{2_k}^I = \sum_{k=0}^{N_C-1} \left(2(x_l + AW_k)\cos\phi + W_k \delta_k^I\right) \approx 2N_c x_l \cos\phi$$

$$u_A^Q = \sum_{k=0}^{N_C-1} W_k u_{2_k}^Q = \sum_{k=0}^{N_C-1} \left(2(x_l + AW_k)\sin\phi + W_k \delta_k^Q\right) \approx 2N_c x_l \sin\phi$$

Phase correction (at symbol-rate, also called channel weighting) using multipliers 608 and 609 produce the signals:

$$u_B^I = u_3^I \cdot u_A^I = 4N_p N_c A x_l \cos^2\phi$$

$$u_B^Q = u_3^Q \cdot u_A^Q = 4N_p N_c A x_l \sin^2\phi$$

After a final addition, in adder 610, we obtain $$u_C = u_B^I + u_B^Q = 4N_p N_c A x_l$$

The data output signal $u_c$ is exactly the same as for the design in FIG. 4.

I have recognized that by restricting to phase estimations at the symbol rate ($N_p = N_c$) I was able to derive a new structure results. Taking phase estimations at the symbol rate is reasonable since the I-, Q-phase will not remain constant over many symbols due to Doppler shift and VCXO frequency offset. However, if we only want to benefit from the Walsh switch idea to half the number of additions in the accumulator part, as described in the following paragraphs, we do not have to restrict to phase estimations at the symbol rate. Then we can apply any kind of channel estimation algorithm for obtaining a channel estimate for performing the channel weighting.

Figure 7:
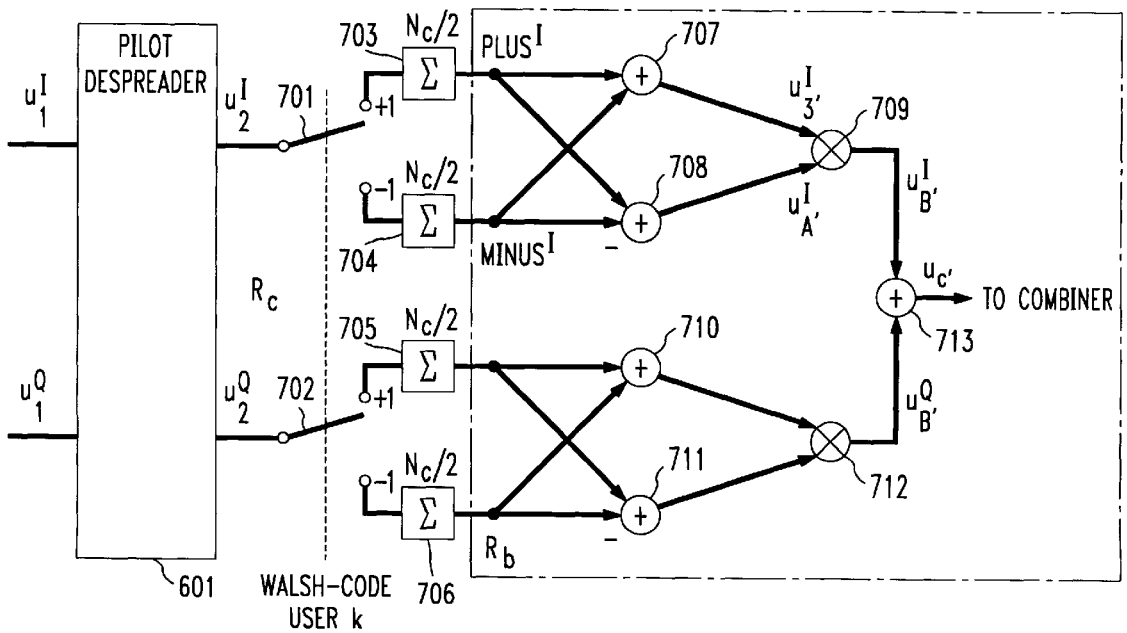
FIG. 7 shows a simplified block diagram of an intermediate design of a first embodiment of the present invention, namely introducing a Walsh switch; this halves the number of additions in the accumulators.

The basic idea is to replace the Walsh-negations, multipliers 604 and 605 of FIG. 6, with Walsh switches 701 and 702 of FIG. 7. As shown in FIG. 7, the result is that accumulators 703–706 perform only half the additions as compared to accumulators 602, 603, 606, and 607 of FIG. 6 ($2N_c$ real additions for demodulating a symbol instead of $4N_c$).

After combining the plus and minus outputs from the accumulators 703 and 704 in adders 707 and 708, the resulting signals are $$u_3^{I,Q} = u_3^{I,Q}(N_p = N_c),\ u_A^{I,Q} = u_a^{I,Q}(N_p = N_c)\ \text{etc.}$$

The outputs of adder 707 being the I component of the pilot correlator, while the output of adder 708 is the I component of the pilot and data correlator.

I have noticed that (e.g. for the I-branch):

$$u_B^I = (\text{plus}^I + \text{minus}^I) \cdot (\text{plus}^I - \text{minus}^I) = \text{plus}^{I^2} - \text{minus}^{I^2}$$

and recognized that the multipliers may now be substituted by "squarers".

Similarly, the outputs from the accumulators 705 and 706 are combined in adders 710 and 711, to produce the signal $u_B^Q$ which also can substitute multipliers with squarers.

Figure 8:
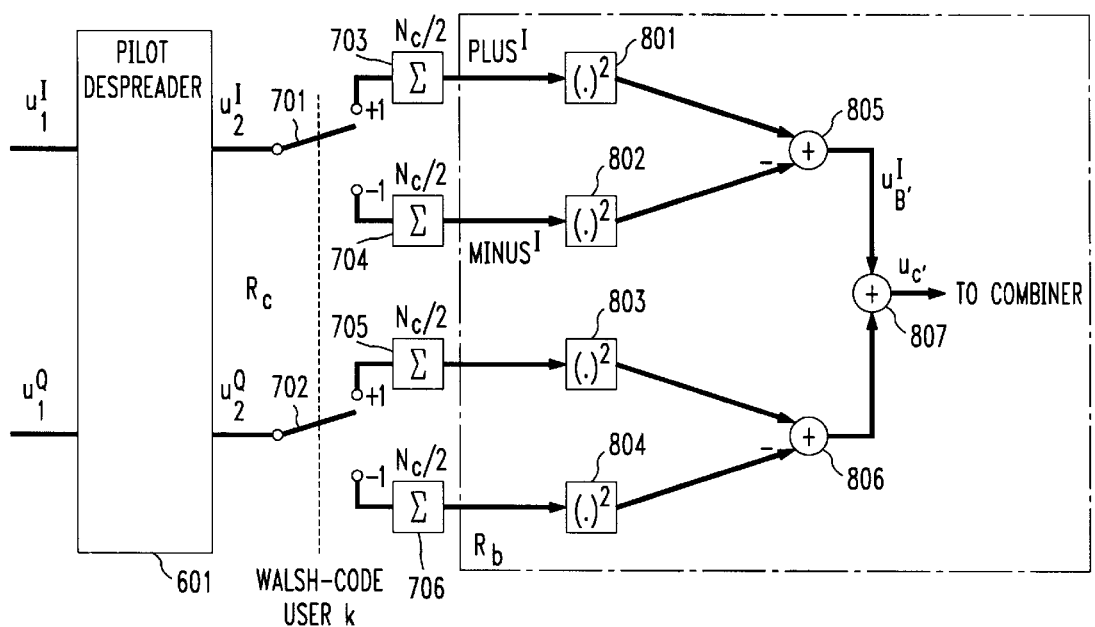
FIG. 8 shows a simplified block diagram of a first embodiment of the present invention, namely Walsh switch and substituting multipliers by squarers

As shown in FIG. 8, my novel structure uses the Walsh switches 701, 702 and squarers 801–804 instead of multipliers 709, 712 of FIG. 7.

After the Walsh switches (701 and 702) and the processing by accumulators (703–706) (plus/minus-accumulator, analysis only for the I-branch) we get at the output of the plus-accumulator 703:

$$\text{plus}^I = \sum_{k=0}^{N_C-1} u_{2_k}^I = \sum_{\substack{k'=0 \\ \wedge W_k = +1}}^{\frac{N_C}{2}-1} (2(x_l + A)\cos\phi + \delta_{k'}^I) \approx N_c(x_l + A)\cos\phi$$

At the output of the minus-accumulator 704 we get:

$$\text{minus}^I = \sum_{k=0}^{N_C-1} u_{2_k}^I = \sum_{\substack{k''=0 \\ \wedge W_k = -1}}^{\frac{N_C}{2}-1} (2(-x_l + A)\cos\phi + \delta_{k''}^I) \approx N_c(-x_l + A)\cos\phi$$

After squaring (using Squarer 801 and 802) and subtraction (using adder 805) the signal becomes:

$$u_B^I = (\text{plus}^I)^2 - (\text{minus}^I)^2 = N_c^2 (x_l + A)^2 \cos^2\phi - N_c^2 (-x_l + A)^2 \cos^2\phi = 4N_c^2 A x_l \cos^2\phi$$

The same operations are performed with the Q-channel branch (using Squarers 803 and 804 and adder 806) which produces the signal:

$$u_B^Q = \ldots = 4N_c^2 A x_l \sin^2\phi$$

Thereafter, the signals are combined in adder 807 to produce the signal:

$$u_C = u_B^I + u_B^Q = 4N_c^2 A x_l$$

The structure of FIG. 8 operates at the same Signal-to-Noise (S/N) ratio as the structure of FIG. 6, if $N_p = N_c$.

Advantageously, the circuit of FIG. 8 requires no multipliers (e.g., 608 of FIG. 6) but does require squarers (e.g., 801–802) to perform the two squaring operations for the I and Q channels at the symbol rate $R_b$. Additionally, in accordance with another aspect of the present invention, the squarers can be implemented as a lookup-table (one-operand operation).

Moreover, this structure may be used for non-coherent energy measurement of the pilot channel by leaving the Walsh switch 701 in the +1 position.

The phase estimation branch (pilot correlator output)—if needed for a certain kind of processing—is still available by adding the plus- and minus-accumulator outputs (at symbol-rate): $u_3^I = \text{plus}^I + \text{minus}^I$ The data correlator outputs are also—if needed—still available: $u_A^I = \text{plus}^I - \text{minus}^I$ Multi-Code CDMA (MC-CDMA) was patented in U.S. Pat. No. 5,442,625 entitled patented by C. -L. I., R. D. Gitlin, "Multi-Code CDMA Wireless Personal Communications Networks" as a packet-based wireless network that accommodates multimedia traffic in any CDMA based system, and as a system that can easily evolve from IS-95 cellular/PCS systems. Some improvements of the basic MC-CDMA receiver structure are presented in the previously-identified patent applications. The substitution of multipliers by squarers—as shown in FIG. 8 for the conventional IS-95 case—is not possible in a MC-CDMA receiver, but the idea of introducing a Walsh switch (see FIG. 7) can also be applied to the coherent MC-CDMA receiver, to further improve its efficiency, described in the co-pending patent application "METHOD AND APPARATUS OF A MULTI-CODE CODE DIVISION MULTIPLE ACCESS RECEIVER USING A SINGLE DATA CORRELATOR" by H. C. Huang, C.-L. I, S. ten Brink, and C. A. Webb III Ser. No. 08/700,262, filed on Aug. 20,1996.

Figure 9:
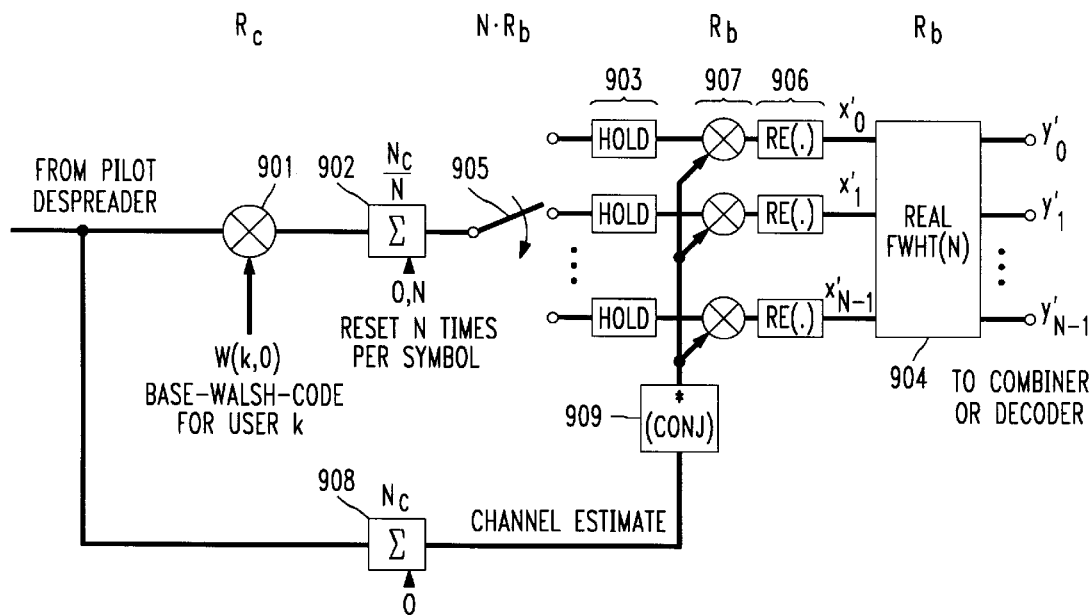
FIG. 9 shows a block diagram of a simplified multiple data correlator arrangement for MC-CDMA.

The FIG. 9, taken from that application, shows the simplified data correlator part of the enhanced MC-CDMA receiver (also referred to as "Skinny Fat finger"). The simplifications in FIG. 9 only address the data correlators, whereas the Walsh switch idea of FIG. 10, as will be discussed below, allows the sharing of the data and pilot correlator results.

With reference to FIG. 9, the real FWHT (Fast Walsh-Hadamard Transformation) unit takes advantage of using "overlayed" Walsh codes of order M, where M is a power of 2, to produce N correlator outputs (for one user k there are N single CDMA channels to demodulate). The complex negator 901 multiplies the Base-Walsh-code W(k,0) for user k with the pilot despreader signal which is then summed in accumulator 902. The accumulator 902 output is reset every $N_C/N$ input samples and the complex intermediate result is stored in hold-buffers 903. Note that in FIG. 9, 10 thick lines stand for complex signals whereas thin lines represent real signals. The demultiplexer or switch 905 selects the particular hold-buffer that is to store a particular intermediate result. At the appropriate time (at the end of each symbol) the outputs from the hold-buffers 903 are multiplied by the channel estimate from complex conjugate circuit 909 in multipliers 907. The outputs of multipliers 907 are then converted to real values by the units 906 [Re(.)]. The units 906 take only the real part of the complex multiplication results which are then further processed by a real FWHT-block 904 to obtain the real-valued outputs $Y_O'-Y_{N-1}'$.

In FIG. 9, the channel estimate is obtained from a separate complex correlation (accumulation) which needs $N_c$ complex additions. Applying the Walsh switch idea to the circuit of FIG. 9 results in the circuit of FIG. 10.

With reference to FIG. 10, it can be seen that introducing a Walsh switch 1001 for the Base-Walsh-code negator 901 of FIG. 9 further reduces the number of complex additions in the data/pilot correlators from $2N_c$ to $N_c+3N$ (example: typically, $N_c=64$; N=4, thus 76 instead of 128 complex additions in the accumulators). The accumulators 1002 and 1003 each perform $N_c/2N$ additions and are reset N times per symbol. The outputs from the accumulators 1002 and 1003 are combined as shown in adders 1004 and 1005. The remainder of the circuit operates in the same manner as previously described for FIG. 9. It should be noted that a channel estimate averaging, which is sometimes desired in a slow fading environment, is still possible with the FIG. 10 structure (inserted in between 908, 909) while maintaining the same savings of addition operations.

While my inventive coherent CDMA receiver-demodulator has been described for use in a forward link utilizing a pilot channel and Walsh encoding to provide coherent operation, it should be noted that other mutually orthogonal codes which maintain coherent operations may also be utilized in both the CDMA transmitter and CDMA receiver (typically in the forward link). Moreover, changing the operation of the forward link and reverse link from coherent and non-coherent, respectively, to non-coherent and coherent, does not affect the operation of the receivers.

What has been disclosed is merely illustrative of the present invention. Other arrangements can be implemented by those skilled in the art without departing from the spirit and scope of the present invention.

I claim:

1. A Code Division Multiple Access, CDMA, receiver comprising means for receiving a coherent CDMA signal including k, where k<or=1, encoded data channels and at least one pilot channel, the k data channels being encoded using mutually orthogonal codes, and a demodulator for decoding a desired one of the k data channels and one of the at least one pilot channels, the demodulator including a switch for switching the desired data channel and the pilot channel to a plurality of accumulator circuits for demodulating the desired data channel the switch being controlled by an orthogonal code of the desired data channel during accumulation.

2. A Multi-Code, MC, Code Division Multiple Access, CDMA, receiver comprising means for receiving and despreading a coherent CDMA signal including k, where k>or=to 1, encoded data channels and at least one pilot channel, the k data channels being encoded using mutually orthogonal codes, and a demodulator for decoding a desired set of N data channels out of the k data channels and one of the at least one pilot channels, the demodulator including a switch for switching the desired set of N data channels and the pilot channel to a plurality of accumulator circuits for demodulating a desired data channel, the switch being controlled by an orthogonal code of the desired data of N data channels during accumulation.

3. The receiving of claim 1 or 2, respectively, wherein the mutually orthogonal codes are Walsh codes.

4. The CDMA receiver of claim 1 wherein after the accumulator circuits squaring circuits are applied for performing the channel weighting.

5. The CDMA receiver of claim 4 wherein the squaring circuits are implemented using a look-up table.

6. The CDMA receiver of claim 4 wherein when the switch is left in a predetermined state, a non-coherent signal energy is determined.

7. The receiver of claim 1 or 2, respectively, wherein the k data channels include at least a Q and an I signal channel.

8. The receiver of claim 1 or 2, respectively, being part of a user station of a CDMA or MC-CDMA system, respectively, including at least one base station and a plurality of user stations.

9. The receiver of claim 1 or 2, respectively, being part of a base station of a CDMA or MC-CDMA system, respectively, including at least one base station and a plurality of user stations.

10. The MC-CDMA receiver of claim 2 wherein the switch includes a first switch for switching the desired set of N data channels and the at least one pilot channel to a Plurality of accumulator circuits for demodulating the desired set of N data channels, the first switch being controlled by an orthogonal code of the desired set of N data channels during accumulation, a second switch alternately switching intermediate accumulation results to the input of a fast transformation circuitry at N times the symbol rate $R_b$ of the data channels and wherein the fast transformation circuitry is optimized to the orthogonal code.

* * * * *